United States Patent
Tanaka et al.

(10) Patent No.: US 10,358,381 B2
(45) Date of Patent: Jul. 23, 2019

(54) METHOD FOR PRODUCING GLASS SHEET, AND GLASS SHEET

(71) Applicant: Nippon Sheet Glass Company, Limited, Tokyo (JP)

(72) Inventors: Satoshi Tanaka, Hyogo (JP); Hirotaka Koyo, Hyogo (JP); Kazuishi Mitani, Osaka (JP); Yasuhiro Saito, Kanagawa (JP); Keiko Tsuri, Osaka (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 355 days.

(21) Appl. No.: 15/114,726

(22) PCT Filed: Jan. 28, 2015

(86) PCT No.: PCT/JP2015/000378
§ 371 (c)(1),
(2) Date: Jul. 27, 2016

(87) PCT Pub. No.: WO2015/115100
PCT Pub. Date: Aug. 6, 2015

(65) Prior Publication Data
US 2016/0340231 A1    Nov. 24, 2016

(30) Foreign Application Priority Data

Jan. 31, 2014    (JP) .................................. 2014-017661

(51) Int. Cl.
*C03C 15/00*    (2006.01)
*C03B 27/012*    (2006.01)
(Continued)

(52) U.S. Cl.
CPC .............. *C03C 15/00* (2013.01); *B63B 19/02* (2013.01); *C03B 18/02* (2013.01); *C03B 27/012* (2013.01); *C03C 3/087* (2013.01); *C03C 23/008* (2013.01)

(58) Field of Classification Search
None
See application file for complete search history.

(56) References Cited

U.S. PATENT DOCUMENTS 6,440,531 B1 *  8/2002  Kurachi ................. C03C 15/00
                                                   428/141
2002/0193233 A1  12/2002  Kishimoto et al.
(Continued)

FOREIGN PATENT DOCUMENTS

EP    3042880 A1    7/2016
EP    3053888 A1    8/2016
(Continued)

OTHER PUBLICATIONS

Extended European Search Report issued for corresponding European Patent Application No. 15743450.7, dated Aug. 22, 2017, 16 pages.

*Primary Examiner* — David Sample
(74) *Attorney, Agent, or Firm* — Hamre, Shcumann, Mueller & Larson, P.C.

(57) ABSTRACT

The glass sheet production method of the present invention is a method for producing a surface-modified glass sheet, including a gas contact step of bringing hydrogen fluoride (HF) gas, hydrogen chloride (HCl) gas, and water vapor into contact with at least one principal surface of a glass sheet. A gas containing the hydrogen fluoride (HF) gas is used in the gas contact step, and in the gas containing the hydrogen
(Continued)

fluoride (HF) gas, a volume ratio of the water vapor to the hydrogen fluoride (HF) gas (volume of water vapor/volume of HF gas) is 8 or more.

12 Claims, 4 Drawing Sheets

(51) Int. Cl.
  *C03C 3/087* (2006.01)
  *B63B 19/02* (2006.01)
  *C03B 18/02* (2006.01)
  *C03C 23/00* (2006.01)

(56) References Cited

U.S. PATENT DOCUMENTS

| | | |
|---|---|---|
| 2014/0246084 A1 | 9/2014 | Okahata |
| 2016/0046519 A1 | 2/2016 | Tanaka et al. |
| 2016/0068423 A1* | 3/2016 | Tanaka .................... C03B 18/20 428/156 |
| 2016/0194242 A1* | 7/2016 | Tanaka .................... C03C 15/00 428/141 |
| 2016/0318794 A1* | 11/2016 | Tanaka .................... C03C 15/00 |
| 2016/0340231 A1* | 11/2016 | Tanaka .................... B63B 19/02 |

FOREIGN PATENT DOCUMENTS

| | | |
|---|---|---|
| EP | 3085672 A1 | 10/2016 |
| JP | 11-278875 | 10/1999 |
| WO | 2011121922 A1 | 10/2011 |
| WO | 2012/141310 | 10/2012 |
| WO | 2012/141311 | 10/2012 |
| WO | 2014/167842 | 10/2014 |
| WO | 2014/175362 | 10/2014 |

\* cited by examiner

METHOD FOR PRODUCING GLASS SHEET, AND GLASS SHEET

TECHNICAL FIELD

The present invention relates to a method for producing a glass sheet and to a glass sheet.

BACKGROUND ART

Conventionally, glass sheets are subjected to various surface treatments for the purpose of giving the glass sheets properties suitable for the intended use. For example, surface treatments are disclosed to densify the surface of glass sheets and thus obtain glass sheets having high mechanical strength such as abrasion resistance. For example, Patent Literature 1 proposes a surface treatment method in which an acidic aqueous solution or vapor generated from the aqueous solution is brought into contact with a glass surface having a temperature equal to or higher than the glass transition temperature so as to obtain a glass having a dense surface structure.

CITATION LIST

Patent Literature

Patent Literature 1: JP 11(1999)-278875 A

SUMMARY OF INVENTION

Technical Problem

The inventors' intensive studies have identified a problem that a dense structure formed on a glass sheet by a conventional surface treatment method cannot be maintained when the glass sheet is subjected to heat treatment, for example, at a thermal tempering temperature (about 650° C.) for common soda-lime glass. This means that there is a problem to be solved, that is, the problem that the properties of the glass sheet provided by the dense structure are significantly changed by the heat treatment.

It is therefore an object of the present invention to provide a glass sheet having a dense structure that can be maintained even after the glass sheet is subjected to heat treatment. The dense structure that can be maintained even after heat treatment may be referred to as a dense structure having heat resistance hereinafter for convenience of description.

Solution to Problem

The present invention provides a method for producing a surface-modified glass sheet, including a gas contact step of bringing hydrogen fluoride (HF) gas, hydrogen chloride (HCl) gas, and water vapor into contact with at least one principal surface of a glass sheet, wherein
a gas containing the hydrogen fluoride (HF) gas is used in the gas contact step, and in the gas containing the hydrogen fluoride (HF) gas, a volume ratio of the water vapor to the hydrogen fluoride (HF) gas (volume of water vapor/volume of HF gas) is 8 or more.

The present invention further provides a glass sheet having a dense structure in at least one principal surface thereof, wherein the glass sheet satisfies the following relations:

pre-heat-treatment ER<1.5 (nm/min); and $\Delta$ER=post-heat-treatment ER−pre-heat-treatment ER<4.0 (nm/min), where: the pre-heat-treatment ER is an etching rate (nm/min) of the principal surface as measured when the principal surface is etched using 0.1 mass % hydrofluoric acid at 50° C. as an etchant; the post-heat-treatment ER is an etching rate (nm/min) of the principal surface as measured when the principal surface is etched using 0.1 mass % hydrofluoric acid at 50° C. as an etchant after a heat treatment in which the glass sheet is heated for 220 seconds to increase a temperature of the principal surface from room temperature to a temperature 95° C. higher than a glass transition temperature of the glass sheet and immediately thereafter the glass sheet is naturally cooled at room temperature; and the $\Delta$ER is an amount of change in the etching rate (nm/min) of the principal surface before and after the heat treatment.

Advantageous Effects of Invention

According to the production method of the present invention, in the gas contact step, both a treatment for forming a dense structure in at least one principal surface of a glass sheet and a treatment for enhancing the heat resistance of the dense structure can be performed. Therefore, according to the production method of the present invention, a glass sheet having, in at least one principal surface thereof, a dense structure that can be maintained even after the glass sheet is subjected to heat treatment.

The glass sheet of the present invention has a dense structure in at least one principal surface thereof. The principal surface having the dense structure has a low etching rate of less than 1.5 nm/min before it is subjected to heat treatment. In addition, in the principal surface of the glass sheet of the present invention, an amount of change in the etching rate before and after the heat treatment is reduced to a low level. Thus, in the glass sheet of the present invention, the dense structure provided in its principal surface can be maintained even after the heat treatment.

DESCRIPTION OF EMBODIMENTS (First Embodiment)

Figure 1:
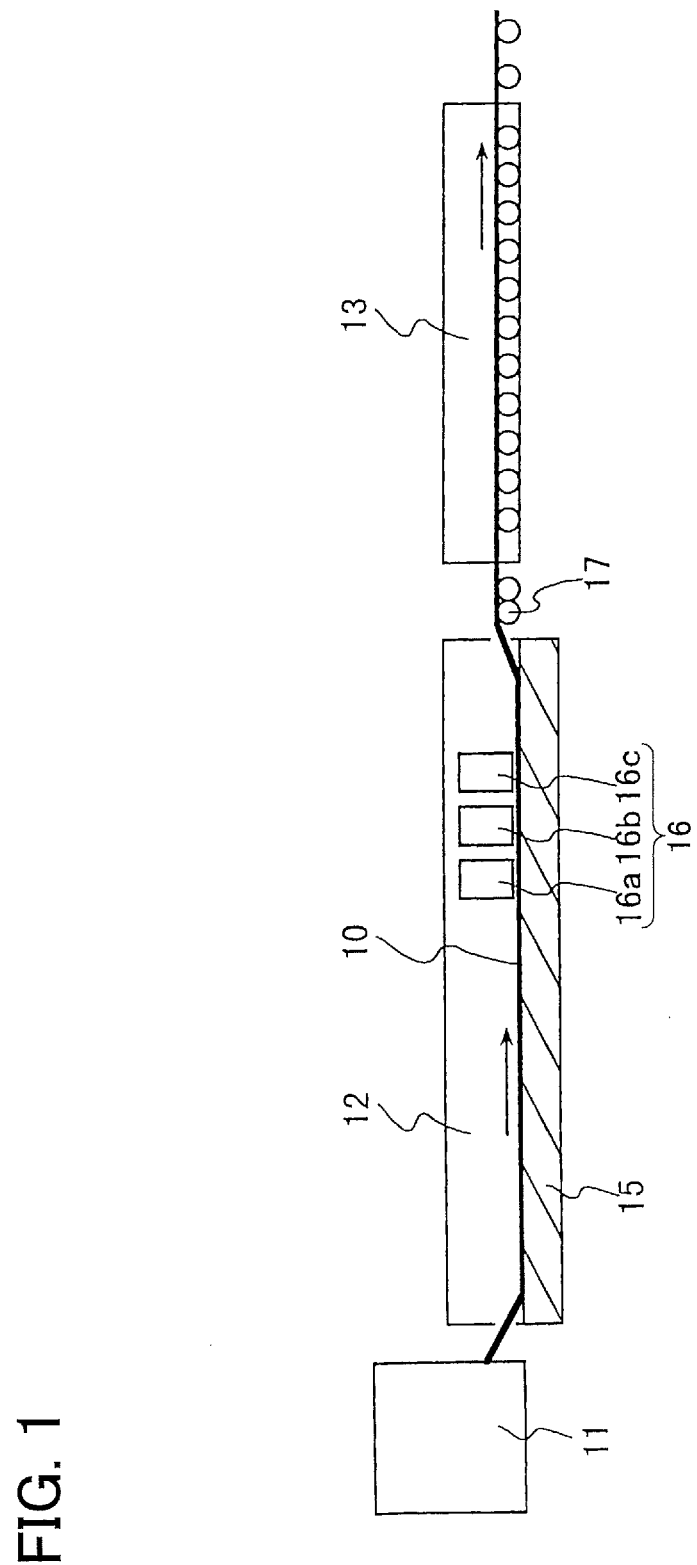
FIG. 1 is a schematic diagram showing an example of a system capable of carrying out a glass sheet production method of the present invention.

An embodiment of the glass sheet production method of the present invention is described. The glass sheet production method of the present embodiment is a method for producing a surface-modified glass sheet. This method includes a gas contact step of bringing hydrogen fluoride (HF) gas, hydrogen chloride (HCl) gas, and water vapor into contact with at least one principal surface of a glass sheet. A gas containing the HF gas is used in the gas contact step, and in the gas containing the HF gas, a volume ratio of the water vapor to the HF gas (volume of water vapor/volume of HF gas) is adjusted to 8 or more.

In the gas contact step in the production method of the present embodiment, a flat and smooth dealkalized layer is formed in the principal surface of the glass sheet that has been in contact with HF gas. In this gas contact step, not only HF gas but also water vapor having a volume at least 8 times the volume of the HF gas is brought into contact with the principal surface of the glass sheet. By bringing a gas containing water vapor and HF gas at such a high volume ratio of the former to the latter into contact with the principal surface, a dense structure can be formed in a region of the principal surface where a dealkalized layer has been formed. The mechanism by which a dealkalized layer and a dense structure are formed in the surface of a glass sheet upon contact with such a gas is described later.

A first example of the gas contact step is described.

A gas used in the first example of the gas contact step is a mixed gas containing HF gas, HCl gas, and water vapor. That is, in the gas contact step, a mixed gas containing HF gas, HCl gas, and water vapor is brought into contact with at least one principal surface of the glass sheet. The mixed gas may be brought into contact with the surface of the glass sheet only once or at least two separate times.

The concentration of the HF gas contained in the mixed gas is preferably 0.5 to 6 vol %, and more preferably 1 to 5 vol %. A substance that is converted into HF in the course of a reaction, that is, a substance from which HF is produced as a result of the reaction, also can be used as the HF contained in the mixed gas. If the concentration of HF gas in the mixed gas is too high, formation of an irregularity pattern in the surface of the glass sheet is promoted, which may make it difficult to form a dense structure. On the other hand, if the concentration of HF gas in the mixed gas is too low, dehydration condensation (to be described in detail) that contributes to formation of a dense structure may not be sufficiently promoted.

The concentration of HCl gas contained in the mixed gas is preferably 0.1 to 15 vol %, more preferably 0.2 to 5 vol %, and even more preferably 0.25 vol % or more. If the concentration of HCl gas is too high, the mixed gas may require careful handling or damage a production facility. On the other hand, if the concentration of HCl in the mixed gas is too low, it may be difficult to improve the heat resistance. A substance that is converted into HCl in the course of a reaction, that is, a substance from which HCl is produced as a result of the reaction, also can be used as the HCl contained in the mixed gas.

The mixed gas further contains water vapor. The mixed gas needs to contain water vapor so that the volume ratio of water vapor to HF gas (volume of water vapor/volume of HF gas) is 8 or more. When a mixed gas in which the volume of water vapor is at least 8 times the volume of HF gas is used, an irregularity pattern is not formed in the surface of a glass sheet but a flat and smooth dense structure (densified layer) can be formed instead. When the mixed gas is brought into contact with the glass, ion exchange occurs and alkali metal ions and alkaline earth metal ions contained in the glass are replaced by protons ($H^+$), water ($H_2O$), and oxonium ions ($H_3O^+$), etc. derived from water vapor in the mixed gas and moisture in the atmosphere. The water vapor in various forms, such as proton ($H^+$), water ($H_2O$), and oxonium ion ($H_3O^+$), enters the glass and then exits from the glass by dehydration condensation. When the volume of water vapor is at least 8 times the volume of HF gas, the glass etching reaction by HF is inhibited, and as a result, a flat and smooth dense structure is formed in the surface of the glass sheet. The concentration of water vapor in the mixed gas is not particularly limited. When the volume of water vapor is less than 8 times the volume of HF gas, the glass etching reaction by HF is promoted, and as a result, irregularities are formed in the surface of the glass sheet in some cases. The presence of these irregularities in the surface of the glass sheet may cause adhesion of dirt on the surface of the glass sheet or reduce alkaline passivation and thus increase alkaline elution from inside the glass sheet. The remainder of the mixed gas except for the acid gases may be water vapor. As described above, the preferred minimum concentrations of HF gas and HCl gas are 0.5 vol % and 0.1 vol % respectively. Therefore, the volume ratio of water vapor to HF gas may be 198.8 (99.4/0.5=198.8) or less.

The mixed gas may contain not only HF gas and HCl gas but also other gases. For example, the mixed gas may contain an inert gas such as $N_2$ or argon as a diluent gas.

The present inventors believe that the reason why the contact between the surface of the glass sheet and the above-mentioned mixed gas can form a dense structure in the surface of the glass sheet as described above and enhance the heat resistance of the dense structure is as follows.

When the mixed gas containing HF, HCl, and water vapor is brought into contact with the surface of the glass sheet, ion exchange occurs. As a result, the water vapor in the mixed gas and the moisture in the atmosphere in various forms, such as proton ($H^+$), water ($H_2O$), and oxonium ion ($H_3O^+$), easily enter the glass.

When HF comes into contact with the surface of the glass, HF breaks Si—O bonds that are basic structures of the glass (Reaction Formulae (1-1) and (1-2) below) or causes a dealkalization reaction to occur (Reaction Formulae (2) and (3) below). A dealkalized layer is formed in the surface of the glass sheet by this dealkalization reaction. In these reactions, phenomena such as corrosion of glass and reprecipitation of glass occur in a complicated manner.

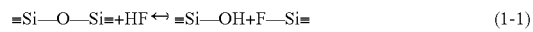   (1-1)

   (1-2)

   (2)

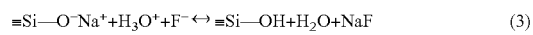   (3)

It is believed that after the supply of the mixed gas is stopped, a dehydration condensation reaction in which the silanol groups produced in the glass are dehydrated and condensed occurs (Reaction Formula (4) below). The mixed gas used in the production method of the present embodiment contains water vapor having a volume at least 8 times the volume of HF gas. Therefore, the glass etching reaction by HF is suppressed and thus formation of a dense structure proceeds dominantly over formation of an irregularity pattern. As a result, a dense structure is formed in the dealkalized layer formed in the glass sheet.

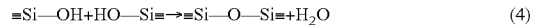   (4)

Based on the above-described mechanism of forming a dense structure, the dense structure formed in the principal surface of the glass sheet in the present embodiment can also be defined as follows. That is, "the glass sheet having a dense structure in its principal surface refers to a glass sheet having an average ratio of protons to Si (average proton ratio) of less than 10 in a region from the principal surface to a depth of 20 nm in a thickness direction (hereinafter referred to as a "principal surface region"). According to the above-described mechanism, Si—O bonds that are basic structures of the glass are broken by the action of HF and the number of silanol groups in the principal surface region of the glass sheet is increased, and as a result, the number of protons in the principal surface region is increased. As described above, a dense structure is formed as dehydration condensation of silanol groups is promoted. Therefore, it can be determined that the degree of densification increases as the dehydration condensation in the principal surface region is promoted, that is, as the proton ratio decreases. Thus, the degree of densification can be expressed by the proton ratio. As used herein, an average proton ratio of less than 10 in the principal surface region of a glass sheet means that the principal surface of the glass sheet has a dense structure. The same applies to dense structures described below. The average proton ratio is determined in the following manner. First, the ratio of the proton intensity to the silicon intensity in a depth direction is determined by secondary ion mass spectrometry (SIMS). "TOF-SIMS 5" manufactured by ION-TOF can be used for the analysis. $Bi^{3+}$ ions are used as primary ions, and $Cs^+$ ions are used for sputtering. The $Cs_2H^+$ peak area is defined as the proton intensity, and the $CsSi^+$ peak area is defined as the silicon intensity. The sputtered depth is measured with a probe-type depth profiler, and the depth at each intensity ratio is calculated from the sputtered depth according to the sputtering time. Next, the average proton ratio from the outermost surface to a depth of 20 nm is determined by depth profiling of the ratio of the proton intensity to the silicon intensity.

As the dehydration condensation reaction of the dealkalized layer formed in the surface region of a glass sheet is promoted by the catalytic action of HCl gas in a mixed gas, a rigid $SiO_2$ network is formed. As a result, the heat resistance of the surface of the glass sheet having a dense structure formed therein.

Next, a second example of the gas contact step is described. In the second example, HF gas and HCl gas are brought into contact with the surface of a glass sheet separately. That is, the gas contact step includes a HF gas contact step and a HCl gas contact step. In the HF gas contact step, a first gas containing HF gas but containing no acid gas other than HF gas is brought into contact with at least one principal surface of the glass sheet. In the HCl gas contact step, a second gas containing HCl but containing no acid gas other than HCl gas is brought into contact with the at least one principal surface of the glass sheet. The order of the HF gas contact step and the HCl gas contact step is not particularly limited. The HCl gas contact step may be performed after the HF gas contact step, or the HF gas contact step may be performed after the HCl gas contact step. The number of operations in each of the HF gas contact step and the HCl gas contact step is also not particularly limited. Therefore, for example, the HF gas contact step, the HCl gas contact step, and the HCl gas contact step may be performed in this order.

By bringing the first gas into contact with the surface of the glass sheet, a dealkalized layer can be formed in the surface of the glass sheet and a dense structure can be formed in the surface region of the dealkalized layer. This mechanism is probably the same as that in the first example. More specifically, by the reactions in Reaction Formulae (1-1), (1-2), (2), (3), and (4) and phenomena such as corrosion of glass and reprecipitation of glass that occur in a complicated manner in these reactions, the dealkalized layer having a dense structure is formed in the surface of the glass sheet.

The concentration of HF gas contained in the first gas is preferably 0.5 to 6 vol %, and more preferably 1 to 5 vol %. A substance that is converted into HF in the course of a reaction, that is, a substance from which HF is produced as a result of the reaction, also can be used as the HF contained in the first gas. If the concentration of HF in the first gas is too high, formation of an irregularity pattern in the surface of the glass sheet is promoted, which may make it difficult to form a dense structure. On the other hand, if the concentration of HF in the first gas is too low, dealkalization reaction may not proceed sufficiently.

The first gas further contains water vapor. The first gas needs to contain water vapor so that the volume ratio of water vapor to HF gas (volume of water vapor/volume of HF gas) is 8 or more. When the first gas in which the volume of water vapor is at least 8 times the volume of HF gas is used, an irregularity pattern is not formed in the surface of a glass sheet but a flat and smooth dense structure (densified layer) can be formed instead. When the first gas is brought into contact with the glass, ion exchange occurs and alkali metal ions and alkaline earth metal ions contained in the glass are replaced by protons ($H^+$), water ($H_2O$), and oxonium ions ($H_3O^+$), etc. derived from water vapor in the first gas and moisture in the atmosphere. The water vapor in various forms, such as proton ($H^+$), water ($H_2O$), and oxonium ion ($H_3O^+$), enters the glass and then exits from the glass by dehydration condensation. When the volume of water vapor is at least 8 times the volume of HF gas, the glass etching reaction by HF is inhibited and thus formation of a dense structure proceeds dominantly over formation of an irregularity pattern, and as a result, a flat and smooth dense structure is formed in the surface of the glass sheet. The concentration of water vapor in the first gas is not particularly limited. When the volume of water vapor is less than 8 times the volume of HF gas, the glass etching reaction by HF is promoted, and as a result, irregularities are formed in the surface of the glass sheet in some cases. The presence of these irregularities in the surface of the glass sheet may cause adhesion of dirt on the surface of the glass sheet or reduce alkaline passivation and thus increase alkaline elution from inside the glass sheet. The remainder of the first gas except for the acid gases may be water vapor. As described above, the preferred minimum concentration of HF gas is 0.5 vol %. Therefore, the volume ratio of water vapor to HF gas may be 199 (99.5/0.5=199) or less. When HF comes into contact with the surface of the glass, the same reactions as those in the first example occur (see Reaction Formulae (1-1), (1-2), (2), and (3) above).

The first gas may contain not only HF gas and water vapor but also other gases. For example, the first gas may contain an inert gas such as $N_2$ or argon as a diluent gas.

The HCl gas contact step is a step for enhancing the heat resistance of the dense structure formed in the HF gas contact step. By bringing the second gas into contact with at least one principal surface of the glass sheet, the heat resistance of the dense structure provided in the surface of the glass sheet can be enhanced by the action of HCl gas contained in the second gas.

The action of HCl gas in the second gas is described. Presumably, the dense structure formed in the surface of the glass sheet in the HF gas contact step has a weak glass network having many silanol groups (≡Si—OH). As the dehydration condensation of a region having this dense structure is promoted by the HCl gas used in the HCl gas contact step, which is performed independently of the HF gas contact step, formation of a rigid $SiO_2$ network proceeds. As a result, the heat resistance of the dense structure is enhanced. This mechanism is described more specifically. When HF is bought into contact with the surface of the glass sheet, a mode in which the $SiO_2$ glass network is etched and a mode in which $Na^+$ ions in the glass are replaced by $H^+$ (or $H_3O^+$) ions by ion exchange proceed. After the contact between the surface of the glass sheet and HF, silanol groups (≡Si—OH) thus produced undergo dehydration condensation to form a ≡Si—O—Si≡ network in the surface of the glass sheet (Reaction Formula (4) above). However, all the silanol groups in the surface are not dehydrated and condensed. Therefore, the surface of the glass sheet having been brought into contact only with the first gas has a glass structure having many silanol groups, in other words, a water-rich glass network. HCl gas is considered to have a catalytic effect on dehydration condensation reaction. Therefore, exposure of the surface of the glass sheet to HCl gas promotes dehydration condensation reaction more efficiently and rapidly, and thus the heat resistance of the dense structure is enhanced.

The concentration of the HCl gas contained in the second gas is preferably 0.1 to 15 vol %, more preferably 0.2 to 5 vol %, and still more preferably 0.25 vol % or more. If the concentration of HCl gas is too high, the second gas may require careful handling or damage a production facility. On the other hand, if the concentration of HCl in the second gas is too low, it may be difficult to improve the heat resistance. A substance that is converted into HCl in the course of a reaction, that is, a substance from which HCl is produced as a result of the reaction, also can be used as the HCl contained in the second gas.

The second gas may or may not contain water vapor. The haze value may increase depending on the amount of water vapor. Therefore, it is desirable to adjust the amount of water vapor in the second gas as needed for the properties, such as a haze value, of a desired glass sheet. The second gas may contain not only HCl gas and water vapor but also other gases as long as it contains no acid gas other than HCl gas. For example, the second gas may contain an inert gas such as $N_2$ or argon as a diluent gas.

As described above, the HCl gas contact step may be performed before or after the HF gas contact step. For example, even if the HCl gas contact step is performed first to bring the HCl gas in the second gas into contact with the surface of the glass sheet and then the HF gas contact step is performed, the effect of the HCl gas in the second gas applied to the surface of the glass sheet in the HCl gas contact step probably remains after the dense structure is formed in the surface of the glass sheet in the HF gas contact step. Therefore, also in this case, the heat resistance of the dense structure formed in the HF gas contact step can be enhanced by the HCl gas contact step. It should be noted, however, that in the case where the HCl gas contact step is performed before the HF gas contact step, dehydration condensation begins first and thus the dense structure may be less likely to be formed than its formation in the case where the HCl gas contact step is performed after the HF gas contact step. Therefore, it is preferable to perform the HCl gas contact step after the HF gas contact step.

In both the first and second examples of the gas contact step, the glass sheet preferably has a temperature in the range of a temperature 40° C. higher than the glass transition temperature to a temperature 120° C. higher than the glass transition temperature, and more preferably a temperature in the range of a temperature 70° C. higher than the glass transition temperature to a temperature 100° C. higher than the glass transition temperature, when it comes into contact with HF gas and HCl gas. A dense structure having higher heat resistance can be formed in the surface of the glass sheet when the set temperature of the glass sheet in contact with the gases is higher.

In the first and second examples of the gas contact step, the time of contact between the gas and the glass material is not particularly limited. For example, it is preferably 2 to 8 seconds, and more preferably 3 to 6 seconds. If the time of contact is too long, formation of an irregularity pattern in the surface of the glass sheet is promoted by HF gas contained in the mixed gas or the first gas, which may make it difficult to form a dense structure. On the other hand, if the time of contact is too short, dealkalization reaction by HF gas may not proceed sufficiently or dehydration condensation by HCl gas may not be promoted sufficiently. As a result, a dense structure may not be formed sufficiently. Therefore, it is desirable to determine the time of contact between the gas and the glass material in view of these circumstances. For example, in bringing the mixed gas into contact with the surface of the glass sheet at least two separate times, it is recommended to carry out the treatment so that the total time of the treatment falls within the above time range.

The glass sheet having undergone the gas contact step is cooled to obtain a surface-modified glass sheet. The cooling method is not particularly limited, and the cooling method performed in any known glass sheet production method can be used.

The surface-modified glass sheet produced by the production method of the present embodiment has both a dense structure and high heat resistance. Therefore, even if heat treatment is applied to the glass sheet thus produced, the dense structure is maintained.

The glass sheet production method of the present embodiment can be applied, for example, to the production of glass sheets by a float process. That is, the gas contact step of the glass sheet production method of the present embodiment may be performed by bringing a gas into contact with at least one principal surface of a glass sheet obtained by forming a glass material into a sheet on a molten metal. This method can be carried out, for example, using a system shown in FIG. 1. An example where the glass sheet production method of the present embodiment is applied to the production of a glass sheet by a float process is described below.

A glass material melted (molten glass) in a float furnace 11 flows from the float furnace 11 into a float bath 12, forms into a semisolid glass ribbon (a sheet-shaped glass material corresponding to a "glass sheet" in the glass sheet production method of the present embodiment) 10 while traveling on molten tin (molten metal) 15, and is then drawn out of the float bath by a roller 17 to be fed into an annealing furnace 13. The glass ribbon solidified in the annealing furnace 13 is cut into glass sheets having a predetermined size by a cutting device which is not shown.

A predetermined number of spray guns 16 (three spray guns 16a, 16b, and 16c in the system shown in the figure) are disposed in the float bath 12 at a predetermined distance from the surface of the high-temperature glass ribbon 10 on the molten tin 15. The gas (the mixed gas containing HF gas and HCl gas, the first gas containing HF gas, or the second gas containing HCl gas) is continuously supplied onto the glass ribbon 10 from at least one of the spray guns 16a to 16c. The temperature of the glass ribbon 10 passing near the spray guns 16a to 16c while moving on the molten tin 15 is set within a range of 450° C. to 630° C.

In the system shown in FIG. 1, the step of cooling the glass sheet is carried out in the annealing furnace 13.

As the glass sheet, any known glass material can be used as long as it has a glass composition that can be used in the float process. For example, common soda-lime glass, aluminosilicate glass, or the like can be used, and such glass typically contains sodium as a component. For example, common clear glass or low iron glass can be used. The thickness of the sheet-shaped glass material to be formed is not particularly limited because it is determined as appropriate depending on the thickness of a glass sheet to be produced. The thickness of the finally obtained glass sheet is not particularly limited, and can be 0.3 to 25 mm, for example.

According to the production method of the present embodiment, it is possible to produce a glass sheet including a dealkalized layer having a dense structure with improved heat resistance only by performing a very simple operation of bringing specific gases into contact with the surface of a glass sheet. In addition, it is also possible to perform the production method of the present embodiment using a production line for the float process, which is a continuous glass sheet production method. Thus, according to the production method of the present invention, it is possible to provide a glass sheet including a dealkalized layer having a dense structure in a more simple way than in conventional methods, without a significant decrease in production efficiency but with a minimal increase in production cost.

In the first and second examples of the gas contact step, the gas contact step is performed on one principal surface of the glass sheet, but the gas contact step is not limited to this case. This step may be performed on both principal surfaces of the glass sheet. In this case, a glass sheet having, in both principal surfaces thereof, a dense structure that can be maintained even if the glass sheet is subjected to heat treatment.

Second Embodiment

An embodiment of the glass sheet of the present invention is described. The glass sheet of the present embodiment has a dense structure in at least one principal surface thereof. This dense structure is, for example, a structure that can be formed in the surface of the glass sheet by the production method of the first embodiment and has high heat resistance. Therefore, even if heat treatment is applied to the glass sheet for thermal tempering, for example, the dense structure can be maintained. The dense structure, the mechanism of formation of the dense structure, and the definition of the dense structure are as described in the first embodiment. Therefore, detailed description thereof is omitted herein.

The glass sheet of the present embodiment satisfies the following relations:

pre-heat-treatment ER<1.5 (nm/min); and

ΔER=post-heat-treatment ER−pre-heat-treatment ER<4.0 (nm/min), where: the pre-heat-treatment ER is an etching rate (nm/min) of the principal surface of the glass sheet of the present embodiment as measured when the principal surface is etched using 0.1 mass % hydrofluoric acid at 50° C. as an etchant; the post-heat-treatment ER is an etching rate (nm/min) of the principal surface of the glass sheet of the present embodiment as measured when the principal surface is etched using 0.1 mass % hydrofluoric acid at 50° C. as an etchant after a heat treatment in which the glass sheet is heated for 220 seconds to increase the temperature of the principal surface from room temperature to a temperature 95° C. higher than the glass transition temperature of the glass sheet and immediately thereafter the glass sheet is naturally cooled at room temperature; and the ΔER is an amount of change in the etching rate (nm/min) of the principal surface before and after the heat treatment. This means that the glass sheet of the present embodiment maintains its surface condition at a low etching rate even after the heat treatment. That is, the glass sheet maintains a dense structure.

When a conventional glass sheet, which has a dense structure formed in its surface by a conventional method, is exposed to high temperatures by heat treatment or the like after the dense structure is formed, the dense structure cannot be maintained. In contrast, the glass sheet of the present embodiment has heat resistance high enough to maintain the dense structure formed in the surface. Therefore, the glass sheet of the present embodiment can be used as a glass sheet for heat treatment to be subjected to a heat treatment and thus has a wide range of applications.

The heat treatment used herein may be a heat treatment for thermal tempering, for example.

The glass sheet of the present embodiment has a variety of applications. For example, the glass sheet of the present embodiment can be used in applications such as glass sheets for chemical strengthening (glass sheets to be subjected to chemical strengthening), highly weather-resistant glass sheets, glass sheets for functional film formation (glass sheets having surfaces on which functional films are to be formed), glass sheets for shower booths, glass sheets for ships, etc.

For example, for a glass sheet for chemical strengthening, it is required that warping caused by chemical strengthening using alkali ion exchange be reduced. The glass sheet of the present embodiment includes, in its surface, a dealkalized layer having a dense structure. Therefore, occurrence of warping during the chemical strengthening can be reduced.

In the case of obtaining a highly weather-resistant glass sheet, a glass sheet for shower booths, or a glass sheet for ships, which is required to be less susceptible to weathering, it is recommended that the glass sheet for such applications be the glass sheet of the present embodiment that has a dense structure formed in its surface and in which the alkali elution amount is less than in a glass sheet that has the same thickness and the same composition and that does not have a dense structure formed in its surface. Because of the small alkali elution amount, this glass sheet is also suitable for use as a glass sheet for functional film formation. A functional film can be formed by well-known sputtering or thermal CVD without any particular limitation. Examples of the functional film that can be formed on the principal surface of the glass sheet by any of these known techniques include low emissivity films, heat reflecting films, photocatalytic films, low reflection films, transparent conductive films, radio shielding films, and ultraviolet/infrared protection films. Low emissivity films, among the functional films mentioned above, can strengthen glass sheets. Therefore, glass sheets with such functional films formed thereon can be used, for example, as glass sheets for buildings for which strength standards are set. Strengthened low emissivity films can be formed by heating low emissivity films at a temperature around 700° C. for 3 to 5 minutes and then cooled rapidly at ordinary temperature.

In the second embodiment, only a glass sheet having a predetermined dense structure in one principal surface thereof is described. However, the present embodiment is not limited to such a glass sheet, and the glass sheet of the present embodiment may have a dense structure in both principal surfaces thereof in some applications. That is, it is also possible to provide a glass sheet that satisfies the following relations for both principal surfaces thereof:

pre-heat-treatment ER<1.5 (nm/min); and

ΔER=post-heat-treatment ER−pre-heat-treatment ER<4.0 (nm/min).

EXAMPLES

Hereinafter, the present invention will be described in more detail using examples. However, the present invention is not limited to the examples given below, and other examples are possible as long as they do not depart from the gist of the present invention.

[Method for Producing Glass Sheet]

Examples 1 to 4

Figure 2:
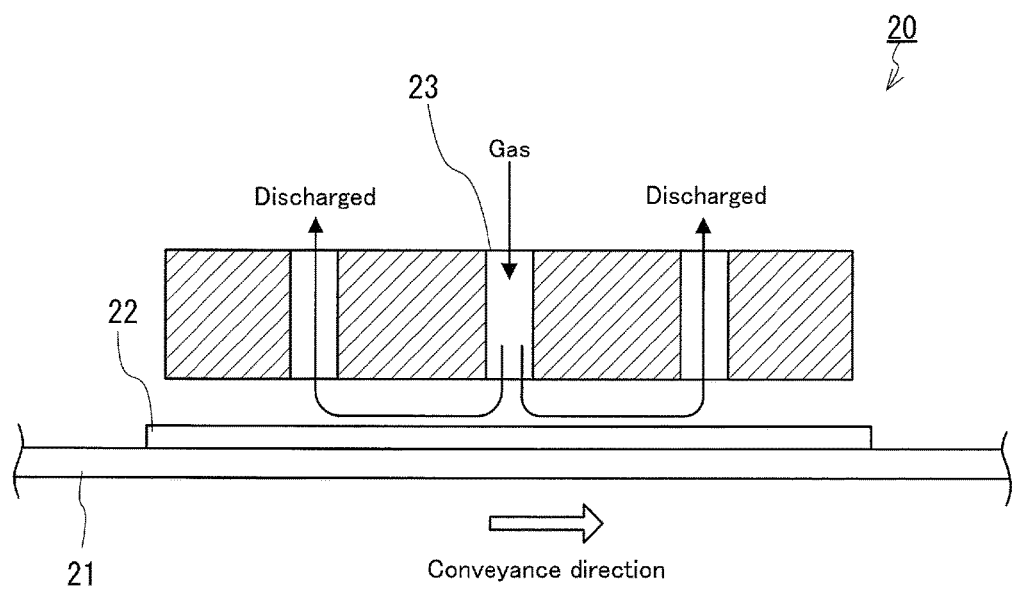
FIG. 2 is a schematic diagram showing an apparatus used in Examples and Comparative Examples.

Glass sheets having a thickness of 4 mm were produced by a float process. First, a glass material was prepared so as to have the following main composition of glass: 70.4% of $SiO_2$, 2.0% of $Al_2O_3$, 8.6% of CaO, 3.9% of MgO, 13.6% of $Na_2O$, and 1.2% of $K_2O$, where "%" means "mass %". The glass material was melted, the molten glass material was formed into a glass ribbon on molten tin in a float bath. The glass transition temperature of this glass material was 555° C. In these Examples, HF gas and HCl gas were separately blown onto one principal surface of each 4-mm-thick glass sheet obtained by cutting the glass ribbon, using a production line different from the glass sheet production line. That is, a first gas containing HF gas and water vapor but not containing HCl gas and a second gas containing HCl gas but not containing HF gas were separately blown onto each glass sheet off-line. The first gas was blown and then the second gas was blown. An apparatus 20 as shown in FIG. 2, including a conveyer mechanism 21 for conveying glass sheets and a spray gun 23 capable of blowing the gas onto the surface of a conveyed glass sheet 22, was used for blowing of the gas in these Examples. The apparatus 20 was also equipped with a heating mechanism (not shown) capable of heating the conveyed glass sheet 22. The gas heated to 180° C. was brought into contact with the glass sheet 22 heated to a predetermined temperature (in a range of 630° C. to 660° C.) for a predetermined time. Table 1 shows the treatment conditions (including the components of the blown gases), the volume ratio of water vapor to HF gas ($H_2O$/HF), the temperature of the glass sheet in contact with the gas, and the time of contact with the gas in each of Examples 1 to 4. $N_2$ gas was used to dilute the blown gas. That is, the remainder of each gas except for the components shown in Table 1 was only $N_2$ gas. 99.99% HCl gas was used as the HCl gas. The HF gas was obtained by evaporating 55 mass % hydrofluoric acid.

Examples 5 to 11

The gas was blown onto glass sheets produced in the same manner as in Examples 1 to 4 using the same apparatus 20. In Examples 5 to 11, however, a first gas and a second gas were not used. Instead, a mixed gas containing HF gas, HCl gas, and water vapor was blown. $N_2$ gas was used to dilute the blown gas. That is, the remainder of the gas except for the components shown in Table 1 was only $N_2$ gas. 99.99% HCl gas was used as the HCl gas. The HF gas was obtained by evaporating 55 mass % hydrofluoric acid.

Comparative Examples 1 to 12

The gas was blown onto each of the glass sheets produced in the same manner as in Examples 1 to 11 using the same apparatus 20. Blowing of the gas was not performed on the glass sheet of Comparative Example 12. The gas was blown in the same manner as in Examples 1 to 11. Table 1 shows the treatment conditions (including the components of the blown gas), the volume ratio of water vapor to HF gas ($H_2O$/HF), the temperature of the glass sheet in contact with the gas, and the time of contact with the gas in each Comparative Example. $N_2$ gas was used to dilute the blown gas. That is, the remainder of the gas except for the components shown in Table 1 was only $N_2$ gas. 99.99% HCl gas was used as the HCl gas. The HF gas was obtained by evaporating 55 mass % hydrofluoric acid.

[Evaluation Method]

(Measurement of Etching Rates Before and after Heat Treatment)

The glass sheets of Examples 1 to 11 and Comparative Examples 1 to 5 and 8 to 12 were subjected to heat treatment, and for each of these glass sheets, the etching rates before and after the heat treatment (pre-heat-treatment ER (nm/min) and post-heat-treatment ER (nm/min)) were measured to calculate the amount of change in the etching rate (ΔER (nm/min)). Table 1 shows the results. The method of subjecting the glass sheets to the heat treatment and the method of measuring the etching rates were as follows.

First, the heat treatment is described. Ten samples of 50 mm×50 mm obtained by cutting each glass sheet were placed in an electric furnace whose temperature could be set at an ambient temperature of 760° C. The surface temperature of the glass sheet samples rose immediately after they were placed in the furnace. Each glass sheet sample was heated for 220 seconds to increase its surface temperature from room temperature to 650° C. (i.e., a temperature 95° C. higher than the glass transition temperature (555° C.) of the glass sheet) and immediately thereafter the glass sheet sample was naturally cooled at room temperature. The temperature 95° C. higher than the glass transition temperature is a temperature determined for thermal tempering.

Next, the method of measuring the etching rates of the principal surface of each glass sheet is described. 0.1 mass % hydrofluoric acid at 50° C. was used as an etchant. The glass sheet was immersed in this etchant and the etching depth was measured every 5 minutes. The time taken for etching to reach the etching depth of 20 nm was obtained by interpolation of the data of two points straddling the depth of 20 nm. The depth of 20 nm was divided by the time thus obtained so as to calculate the etching rate (nm/min) at which etching reached the depth of 20 nm. The etching rates of the principal surface of each glass sheet were measured before and after the heat treatment. The etching amount was measured by applying a hydrofluoric acid-resistant masking agent onto a portion of the unetched glass sheet, subjecting the glass sheet to etching, and measuring the difference in the level between the masked portion and the etched portion formed by etching. The level difference was measured using a thickness meter (Alpha-Step 500 manufactured by KLA-Tencor Corporation).

(Haze Ratio Before Heat Treatment)

For each of the glass sheets of Examples 1 to 11 and Comparative Examples 1 to 12, the haze ratio was measured using "Haze-Guard Plus" manufactured by BYK Gardner and Illuminant C before the heat treatment. Table 1 shows the results.

TABLE 1

| | Treatment conditions | Time of contact with gases (sec) | $H_2O/HF$ | Temperature of glass sheet (° C.) | Haze ratio (%) Before heat treatment | Etching rate (nm/min) Before heat treatment | After heat treatment | Amount of change |
|---|---|---|---|---|---|---|---|---|
| Ex. 1 | 4% HF60% $H_2O \to$ 4% HCl + 60% $H_2O$ | 15 | 3.4→3.4 | 650 | 0.0 | 0.7 | 1.3 | 0.6 |
| Ex. 2 | 4% HF60% $H_2O \to$ 1% HCl + 15% $H_2O$ | 15 | 3.4→3.4 | 650 | 0.0 | 1.0 | 1.4 | 0.4 |
| Ex. 3 | 4% HF + 60% $H_2O \to$ 4% HCl | 15 | 3.4→3.4 | 650 | 0.1 | 0.7 | 1.8 | 1.0 |
| Ex. 4 | 3% HF + 60% $H_2O \to$ 4% HCl + 60% $H_2O$ | 20 | 3.4→3.4 | 630 | 0.1 | 0.8 | 1.9 | 1.1 |
| Ex. 5 | 3% HF + 60% $H_2O$ + 1% HCl | 20 | 3 | 660 | 0.3 | 1.1 | 2.0 | 0.9 |
| Ex. 6 | 4% HF + 40% $H_2O$ + 1% HCl | 10 | 6 | 660 | 0.1 | 0.7 | 1.9 | 1.2 |
| Ex. 7 | 4% HF + 40% $H_2O$ + 4% HCl | 10 | 6 | 660 | 0.2 | 0.9 | 1.5 | 0.6 |
| Ex. 8 | 4% HF + 40% $H_2O$ + 1% HCl | 10 | 6 | 630 | 0.2 | 0.7 | 2.6 | 1.9 |
| Ex. 9 | 4% HF + 40% $H_2O$ + 1% HCl | 10 | 6 | 590 | 0.2 | 0.8 | 4.5 | 3.7 |
| Ex. 10 | 4% HF + 60% $H_2O$ + 1% HCl | 15 | 6 | 550 | 0.1 | 0.7 | 4.1 | 3.4 |
| Ex. 11 | 4% HF + 60% $H_2O$ + 4% HCl | 15 | 3 | 600 | 0.0 | 0.4 | 3.6 | 3.2 |
| Com. Ex. 1 | 4% HF + 60% $H_2O \to$ 4% HF + 60% $H_2O$ | 15 | 3.4→3.4 | 650 | 0.1 | 0.9 | 4.9 | 4.1 |
| Com. Ex. 2 | 3% HF + 60% $H_2O \to N_2$ | 20 | 3.4→3.4 | 630 | 0.1 | 4.7 | 9.8 | 5.1 |
| Com. Ex. 3 | 4% HF + 60% $H_2O$ | 15 | 3 | 660 | 0.2 | 3.1 | 9.7 | 6.6 |
| Com. Ex. 4 | 4% HCl + 60% $H_2O$ | — | 3 | 660 | 0.1 | 6.8 | 8.8 | 2.0 |
| Com. Ex. 5 | 4% HCl | — | 3 | 660 | 0.1 | 9.6 | 10.6 | 1.0 |
| Com. Ex. 6 | 4% HF + 3.6% $H_2O$ | 0.9 | 3 | 660 | 0.4 | — | — | — |
| Com. Ex. 7 | 4% HF + 3.6% $H_2O$ + 1% HCl | 0.9 | 3 | 660 | 16.2 | — | — | — |
| Com. Ex. 8 | 4% HF + 40% $H_2O$ | 10 | 6 | 660 | 0.0 | 1.4 | 6.1 | 4.7 |
| Com. Ex. 9 | 4% HF + 40% $H_2O$ | 10 | 6 | 630 | 0.1 | 2.9 | 9.2 | 6.3 |
| Com. Ex. 10 | 4% HF + 40% $H_2O$ | 10 | 6 | 590 | 0.1 | 1.8 | 11.1 | 9.3 |
| Com. Ex. 11 | 4% HF + 60% $H_2O$ | 15 | 6 | 550 | 0.1 | 0.9 | 7.8 | 6.8 |
| Com. Ex. 12 | No treatment | — | — | — | 0.0 | 12.5 | 13.0 | 0.5 |

Figure 3:
FIG. 3 is a scanning electron microscope (SEM) photograph of a surface of a glass sheet of Example 1.
Figure 4:
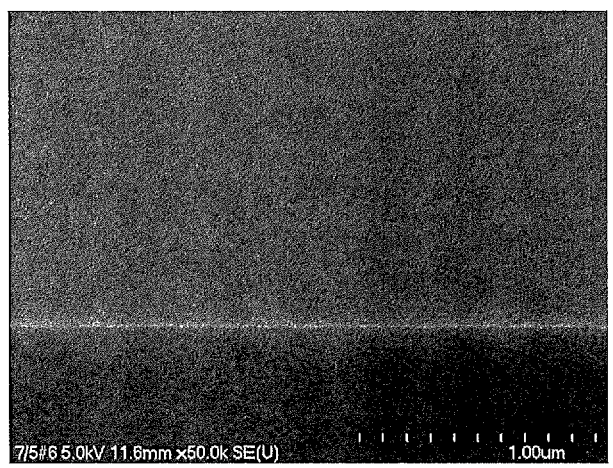
FIG. 4 is a SEM photograph of a surface of a glass sheet of Example 4.

In the glass sheets produced by the production methods of Examples 1 to 11 that met all the requirements of the production method of the present invention, the pre-heat-treatment etching rates were as low as less than 1.5 nm/min, which means that dense structures were formed in the surfaces of these glass sheets. SEM photographs of the surfaces of the glass sheets of Examples 1 and 4 (FIG. 3 showing the glass sheet of Example 1 and FIG. 4 showing the glass sheet of Example 4) revealed that these glass sheets each had a dense structure with a flat and smooth surface. In addition, in the glass sheets of Examples 1 to 11, the amounts of change in the etching rate before and after heat treatment were as small as less than 4.0 nm/min. This means that the glass sheets produced by the production methods of Examples 1 to 11 were glass sheets each having a dense structure and capable of maintaining this dense structure even after heat treatment. For the glass sheet of Example 1, the average proton ratio in the principal surface region was measured by the method described in the first embodiment. As a result, the average proton ratio was less than 10.

On the other hand, the glass sheets produced by the production methods of Comparative Examples 1 to 12 that did not meet the requirements of the production method of the present invention were glass sheets each having no dense structure in its principal surface or glass sheets each having a dense structure in its principal surface before heat treatment but incapable of maintaining the dense structure after the heat treatment.

A more detailed analysis of the results of Examples and Comparative Examples is given below.

The glass sheets of Example 1 and Comparative Example 1 were produced under the same conditions and the glass sheets of Example 4 and Comparative Example 2 were produced under the same conditions, except that HCl gas was brought into contact with the glass sheets of Examples but was not brought into contact with the glass sheets of Comparative Examples. In the glass sheets of Comparative Examples 1 and 2 having had no contact with HCl gas, an increase in the etching rate from before to after the heat treatment was much greater than that in the glass sheets of Examples 1 and 4. This is probably because the heat resistance of the dense structures in the glass sheets of Comparative Examples 1 and 2 having had no contact with HCl gas could not be enhanced. The same result can be proved by comparisons between the glass sheets of Examples 6 and 7 and the glass sheet of Comparative Example 8 and between the glass sheet of Example 8 and the glass sheet of Comparative Example 9.

In Example 2, HCl gas with a lower concentration was brought into contact with the glass sheet than in Example 1. However, the amount of change in the etching rate in Example 2 was almost equal to that in Example 1, which means that the heat resistance of the dense structure was improved in both Examples 1 and 2. A comparison between Example 1 and Example 3 indicates that the presence or absence of water vapor in a gas containing HCl gas has no significant effect on the heat resistance of glass sheets.

Preferably, the glass sheet has a higher temperature when it comes into contact with the gas. This is evident from the fact that the amount of change in the etching rate was smaller in Example 6 in which the gas was brought into contact with the glass sheet having a temperature of 660° C. than in Example 8 in which the gas was brought into contact with the glass sheet having a temperature of 630° C. Furthermore, the amount of change in the etching rate was smaller in Example 8 in which the temperature of the glass sheet was in the range of a temperature 40° C. higher than the glass transition temperature to a temperature 120° C. higher than the glass transition temperature than in Example 9 in which the temperature of the glass sheet was outside this temperature range.

Figure 5:
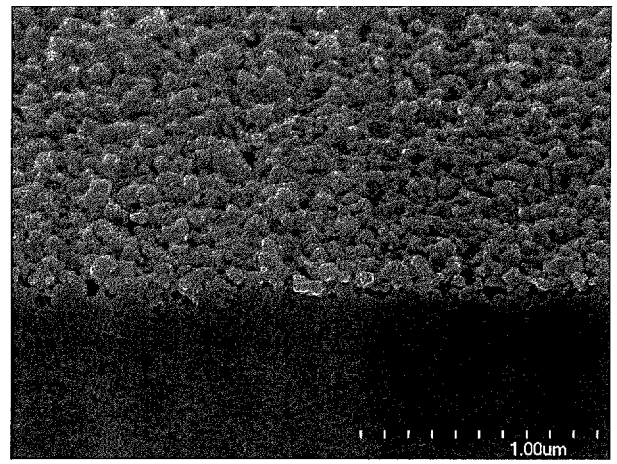
FIG. 5 is a SEM photograph of a surface of a glass sheet of Comparative Example 6.
Figure 6:
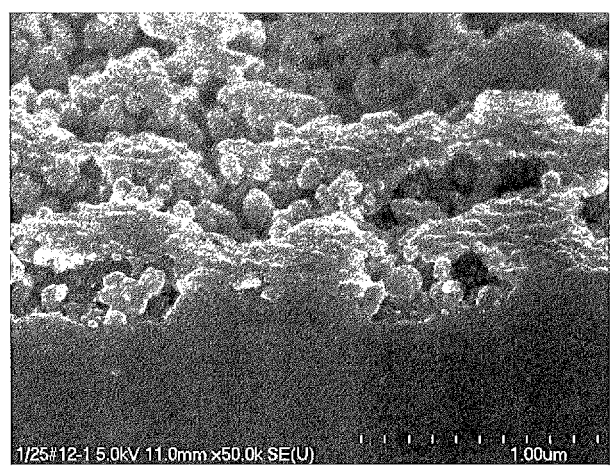
FIG. 6 is a SEM photograph of a surface of a glass sheet of Comparative Example 7.

In the gas containing HF gas used in each of Comparative Examples 6 and 7, the volume of water vapor was less than 8 times the volume of HF gas. As a result, the glass sheets of Comparative Examples 6 and 7 did not have a flat and smooth surface, as observed from SEM photographs shown in FIG. 5 and FIG. 6 (FIG. 5 showing the glass sheet of Comparative Example 6 and FIG. 6 showing the glass sheet of Comparative Example 7). In addition, the glass sheet of Comparative Example 7 had a high haze ratio. For the glass sheets of Comparative Examples 6 and 7, the etching rates were not measured because these glass sheets did not have a flat and smooth surface.

INDUSTRIAL APPLICABILITY

The glass sheet of the present invention having a dense structure in its principal surface can maintain the dense structure even after heat treatment applied thereto. The glass sheet of the present invention can be used for various applications such as glass sheets for chemical strengthening, weather-resistant glass sheets, glass sheets for functional film formation, glass sheets for shower booths, glass sheets for ships, etc. The glass sheet of the present invention is also suitable for use as a glass sheet for heat treatment to be subjected to a heat treatment for thermal tempering, for example.

The invention claimed is:

1. A method for producing a surface-modified glass sheet, comprising a gas contact step of bringing hydrogen fluoride (HF) gas, hydrogen chloride (HCl) gas, and water vapor into contact with at least one principal surface of a glass sheet, wherein
a gas containing the hydrogen fluoride (HF) gas is used in the gas contact step, and in the gas containing the hydrogen fluoride (HF) gas, a volume ratio of the water vapor to the hydrogen fluoride (HF) gas (volume of water vapor/volume of HF gas) is 8 or more, and
the surface-modified glass sheet comprises a dense structure in at least one principal surface thereof, wherein the glass sheet satisfies the following relations:

pre-heat-treatment ER<1.5(nm/min); and

ΔER=post-heat-treatment ER−pre-heat-treatment ER<4.0(nm/min), where: the pre-heat-treatment ER is an etching rate (nm/min) of the principal surface as measured when the principal surface is etched using 0.1 mass % hydrofluoric acid at 50° C. as an etchant; the post-heat-treatment ER is an etching rate (nm/min) of the principal surface as measured when the principal surface is etched using 0.1 mass % hydrofluoric acid at 50° C. as an etchant after a heat treatment in which the glass sheet is heated for 220 seconds to increase a temperature of the principal surface from room temperature to a temperature 95° C. higher than a glass transition temperature of the glass sheet and immediately thereafter the glass sheet is naturally cooled at room temperature; and the ΔER is an amount of change in the etching rate (nm/min) of the principal surface before and after the heat treatment.

2. The method for producing a surface-modified glass sheet according to claim 1, wherein in the gas contact step, the glass sheet has a temperature ranging from a temperature 40° C. higher than a glass transition temperature to a temperature 120° C. higher than the glass transition temperature.

3. The method for producing a surface-modified glass sheet according to claim 1, wherein in the gas contact step, a mixed gas containing hydrogen fluoride (HF) gas, hydrogen chloride (HCl) gas, and water vapor is brought into contact with the at least one principal surface of the glass sheet.

4. The method for producing a surface-modified glass sheet according to claim 1, wherein
the gas contact step comprises: a hydrogen fluoride (HF) gas contact step; and a hydrogen chloride (HCl) gas contact step,
in the hydrogen fluoride (HF) gas contact step, a first gas is brought into contact with the at least one principal surface of the glass sheet, the first gas containing hydrogen fluoride (HF) gas and water vapor but containing no acid gas other than hydrogen fluoride (HF) gas, and
in the hydrogen chloride (HCl) gas contact step, a second gas is brought into contact with the at least one principal surface of the glass sheet, the second gas containing hydrogen chloride (HCl) gas but containing no acid gas other than hydrogen chloride (HCl) gas.

5. A glass sheet comprising a dense structure in at least one principal surface thereof, wherein the glass sheet satisfies the following relations:

pre-heat-treatment ER<1.5(nm/min); and

ΔER=post-heat-treatment ER−pre-heat-treatment ER<4.0(nm/min), where: the pre-heat-treatment ER is an etching rate (nm/min) of the principal surface as measured when the principal surface is etched using 0.1 mass % hydrofluoric acid at 50° C. as an etchant; the post-heat-treatment ER is an etching rate (nm/min) of the principal surface as measured when the principal surface is etched using 0.1 mass % hydrofluoric acid at 50° C. as an etchant after a heat treatment in which the glass sheet is heated for 220 seconds to increase a temperature of the principal surface from room temperature to a temperature 95° C. higher than a glass transition temperature of the glass sheet and immediately thereafter the glass sheet is naturally cooled at room temperature; and the ΔER is an amount of change in the etching rate (nm/min) of the principal surface before and after the heat treatment.

6. The glass sheet according to claim 5, wherein
the glass sheet is a glass sheet for heat treatment to be subjected to a heat treatment, and
the heat treatment is a heat treatment for thermal tempering.

7. The glass sheet according to claim 5, wherein
the glass sheet is a glass sheet for chemical strengthening to be subjected to chemical strengthening,
a dealkalized layer is formed at least in the principal surface of the glass sheet, and
the dense structure is formed in a surface of the dealkalized layer.

8. The glass sheet according to claim 5, wherein
an alkaline elution amount is less than in a glass sheet that has the same thickness and the same composition as the glass sheet and that does not have a dense structure formed in its surface.

9. The glass sheet according to claim 5, wherein
the glass sheet is a glass sheet for functional film formation having the principal surface as a surface on which a functional film is to be formed, and
an alkaline elution amount is less than in a glass sheet that has the same thickness and the same composition as the glass sheet for functional film formation and that does not have a dense structure formed in its surface.

10. The glass sheet according to claim 9, wherein the functional film is formed by sputtering or thermal CVD.

11. The glass sheet according to claim 5, wherein
the glass sheet is a glass sheet for shower booths, and an alkaline elution amount is less than in a glass sheet that has the same thickness and the same composition as the glass sheet for shower booths and that does not have a dense structure formed in its surface.

12. The glass sheet according to claim 5, wherein
the glass sheet is a glass sheet for ships, and
an alkaline elution amount is less than in a glass sheet that has the same thickness and the same composition as the glass sheet for ships and that does not have a dense structure formed in its surface.

* * * * *